United States Patent [19]

Nagashima et al.

[11] Patent Number: 4,809,438

[45] Date of Patent: Mar. 7, 1989

[54] ROTARY CUTTER AND SUPPORT

[75] Inventors: Akira Nagashima, Kawasaki; Fujio Sasaki, Mitaka, both of Japan

[73] Assignee: Kioritz Corporation, Tokyo, Japan

[21] Appl. No.: 110,467

[22] Filed: Oct. 20, 1987

[30] Foreign Application Priority Data

Oct. 22, 1986 [JP] Japan .............................. 61-161756[U]

[51] Int. Cl.⁴ ............................................. B23D 45/16
[52] U.S. Cl. ........................................ 30/390; 30/122; 125/13 R
[58] Field of Search ................. 30/122, 381, 388, 500, 30/390; 125/13 R; 172/14, 15; 51/170 PT, 170 T

[56] References Cited

U.S. PATENT DOCUMENTS 3,513,888  5/1970  Townsend et al. .
3,583,106  6/1971  Dibbertin ...................... 51/170 PT
3,735,489  5/1973  Zatorsky, Jr. ....................... 30/390
3,893,240  7/1975  Morner et al. ....................... 30/390

Primary Examiner—Douglas D. Watts
Attorney, Agent, or Firm—Browdy and Neimark

[57] ABSTRACT

An engine cutter wherein elongated box-like portions each having a trapezoidal cross-sectional shape, which are extended longitudinally at both upper and lower sides of an arm protruding forwardly of a main body, are formed symmetrically with each other with respect to the longitudinal center axis of the arm, and a thickness at the central portion of the arm connecting the box-like portions is determined to be smaller than the width of the base portion of the box-like portions, while the belt is extended within the space of the box-like portions.

1 Claim, 2 Drawing Sheets

ROTARY CUTTER AND SUPPORT

BACKGROUND OF THE INVENTION

1. Field of the Invention

The present invention relates to an engine cutter comprising a main body, a prime mover mounted on the main body, an arm fixed at the rear end thereof on the main body and extending forwardly of said main body, a cutter rotatably connected to the distal end of the arm, and a belt extending along the arm for transmitting the power of the prime mover to the cutter.

2. Description of the Prior Art

Conventionally, an engine cutter of this type has various problems such as, an associated plate-like arm having a cutter disc at its distal end is heavy in weight and rigidity of the arm is weak laterally, so that the cutting operations become unstable restricting accurate cutting, and the arm cannot be turned upside down.

SUMMARY OF THE INVENTION

Accordingly, one object of the present invention is to solve the problems of such conventional engine cutter and to provide an engine cutter having a simple structure of convenient type.

That is, an engine cutter according to the present invention is of a structure which is characterized in that an arm comprises elongated box-like portions each having a trapezoidal cross-sectional shape extending longitudinally at both upper and lower sides of the arm, and a central portion connecting these box-like portions, and the box-like portions are symmetrically formed with each other with respect to the longitudinal center axis of the arm, and the central portion is so formed that its lateral thickness is smaller than the width of the base portion of each box-like portion, while a belt is extended within the space of the box-like portions, whereby the arm can be of a structure so light-weight as having the relatively thin wall, the arm can be also increased in rigidity since the trapezoidal-shaped box-like portions are provided at both upper and lower sides of the central portion of the arm, and both box-like portions are disposed symmetrically so that the arm will be turned upside down.

The present invention can thus save labor during the operation by decreasing the weight of the arm supporting the cutter, the arm is reinforced by the rigid structure, the arm is prevented from lateral movement in order to establish safety and reliable cutting operations, and the arm can be used by turning upside down.

DESCRIPTION OF THE PREFERRED EMBODIMENT

One preferred embodiment of the present invention will be fully described hereinafter with reference to the accompanied drawings.

Figure 1:
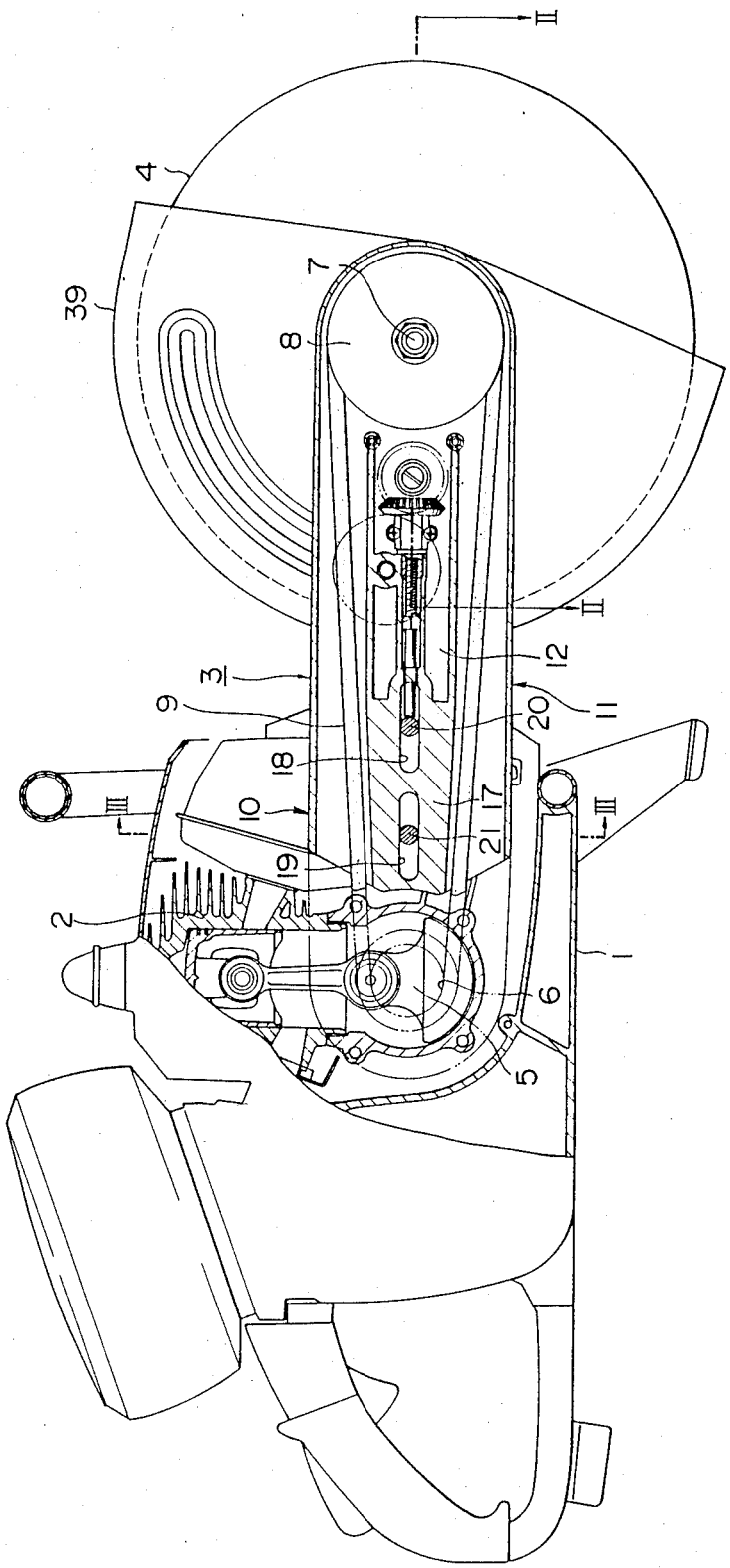
FIG. 1 is a vertical cross-sectional view showing a main part of an engine cutter in accordance with one embodiment of the present invention.
Figure 2:
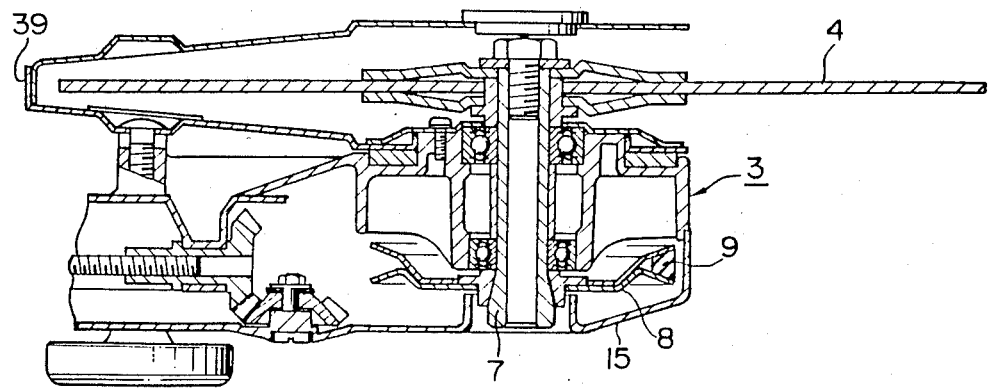
FIG. 2 is a cross-sectional view taken along a line II—II in FIG. 1.
Figure 3:
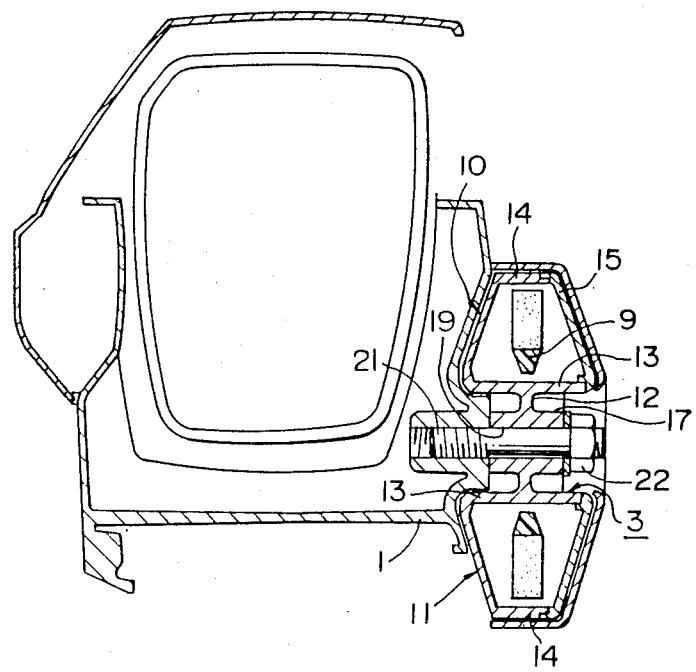
FIG. 3 is a cross-sectional view taken along a line III—III in FIG. 1.

An engine cutter according to one embodiment of the present invention includes, as shown in FIGS. 1 and 2, a main body 1, an internal combustion engine 2 as a prime mover mounted on the main body 1, an arm 3 fixed at the rear end thereof on one side of the main body 1 and extending forwardly from the main body 1, a disc cutter 4 rotatably attached on the distal end portion of the arm 3, and an endless V-belt 9 for rotatively driving the cutter 4 stretched across one belt pulley 6 having a smaller diameter connected to an output shaft 5 of the internal combustion engine 2 and the other opposite belt pulley 8 of a larger diameter connected to a rotational shaft 7 of the cutter 4 causing it to be extended along the arm 3.

The arm 3 is made of light and rigid materials such as aluminium alloys, and includes elongated box-like portions 10 and 11 each having a trapezoidal cross-sectional shape and extending longitudinally at both upper and lower sides of the arm 3, and a central portion 12 integrally formed with and between these box-like portions 10 and 11. The box-like portions 10, 11 are formed symmetrically with each other with respect to the longitudinal center axis of the arm 3. Each of the box-like portions are provided with base portions 13 continuous with the central portion 12 each having the width greater than that of opposite top portion 14, and one side of the portions 10 and 11 adjacent to the base portions 13 and opposite to the main body 1 are opened outwardly and closed with a cover 15 as mentioned below. Within the inner space of the box-like portions 10 and 11 defined in this manner the belt 9 stretchedly extends between the belt pulleys 6 and 8.

The rear portion of the central portion 12 close to the rear end of the arm 3 forms a solid portion 17 whose thickness is increased laterally. This solid portion 17 has a value of thickness which is smaller than the width of the base portion 13 and larger than that of the top portion 14. The solid portion 17 includes a pair of grooves 18 and 19 spaced in series and defined along the longitudinal center axis of the arm 3, through which grooves 18 and 19, each of stud bolts 20 and 21 provided horizontally on the side of the main body 1 penetrate. By the engagement between the grooves 18, 19 and the stud bolts 20, 21, the arm 3 can be longitudinally moved relative to the main body 1 by a distance within the length of each groove 18, 19 to adjust a tension of the belt 9. The arm 3 will be, however, securely fixed on the main body 1 without a possible displacement of the arm 3 in vertical or upward and downward directions. The stud bolts 20 and 21 are threadably fitted with nuts 22 at the screw portions of the distal ends, so that the arm 3 can be rigidly secured to the main body 1 by fastening the respective nuts 22.

Fastener means (not shown) are screwed into the arm 3 so as to sustain the cover 15 thereon and close the opened side of the arm 3.

The cutter 4 may be partially covered by a semi-circular cover 39 to expose a portion of the cutter 4.

What is claimed is:

1. An engine cutter comprising a main body, a prime mover mounted on the main body, an arm fixed at the rear end thereof on the main body and extending forwardly of said main body, a cutter rotatably attached on the distal end of the arm, and a belt extending along the arm to transmit the power of the prime mover to said cutter, said arm comprising elongated box-like portions each having a trapezoidal cross-sectional shape extending longitudinally at both upper and lower sides of said arm, each box-like portion comprising a top portion, a base portion opposite to said top portion, and two sides, and a central portion connecting these box-like portions, and said box-like portions being symmetrically formed with each other with respect to the longitudinal center axis of the arm, and the central portion being so formed that its lateral thickness is smaller than the width of said base portion of each box-like portion, said belt being extended within the space of the box-like portions, wherein said base portion is continuous with said central portion and has a width greater than the width of said top portion and one of said sides which is opposite to said main body is opened outwardly and closable with a cover.

* * * * *